US010282850B2

(12) United States Patent
Wroblewski

(10) Patent No.: US 10,282,850 B2
(45) Date of Patent: May 7, 2019

(54) METHOD AND IMPLEMENTATION TO DETECT COORDINATED MOTIONS OF MULTIPLE ENTITIES

(71) Applicant: The United States of America as represented by the Secretary of the Navy, Washington, DC (US)

(72) Inventor: Ronald J. Wroblewski, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 237 days.

(21) Appl. No.: 15/492,769

(22) Filed: Apr. 20, 2017

(65) Prior Publication Data

US 2018/0308239 A1    Oct. 25, 2018

(51) Int. Cl.
    *G06F 16/22*      (2019.01)
    *G06T 7/231*      (2017.01)

(52) U.S. Cl.
    CPC .......... *G06T 7/231* (2017.01); *G06F 16/2264* (2019.01); *G06T 2207/10044* (2013.01); *G06T 2207/20021* (2013.01); *G06T 2207/20072* (2013.01); *G06T 2207/30248* (2013.01)

(58) Field of Classification Search
    CPC ............ G06T 7/231; G06T 2207/1004; G06T 2207/20021; G06T 2207/20071; G06T 2207/30248; G06T 12/00; G06F 16/2264
    See application file for complete search history.

(56) References Cited

U.S. PATENT DOCUMENTS

| | | |
|---|---|---|
| 6,636,847 B1 | 10/2003 | Spires |
| 6,859,455 B1 | 2/2005 | Yasdani et al. |
| 7,167,856 B2 | 1/2007 | Lawder |
| 7,400,784 B2 | 7/2008 | Joly |
| 7,567,972 B2 | 7/2009 | Geiselhart et al. |
| 8,055,687 B2 | 11/2011 | Zhang et al. |
| 8,688,723 B2 | 4/2014 | Zhang et al. |
| 2007/0156294 A1* | 7/2007 | Tipping ............. G05B 13/0265 701/1 |

(Continued)

OTHER PUBLICATIONS

Jensen, Christian S., Lin, Dan, Ooi, Beng Chin "Indexing of Moving Objects, Bx-Tree" Encyclopedia of GIS. (Year: 2017).*

(Continued)

*Primary Examiner* — Kim Y Vu
*Assistant Examiner* — Molly Delaney
(74) *Attorney, Agent, or Firm* — SPAWAR Systems Center Pacific; Kyle Eppele

(57) ABSTRACT

A system is provided for determining coordinated motion between objects. The system includes a velocity data receiving component, a position data receiving component, a multidimensional indexing component and a determining component. The velocity data receiving component receives velocity data of the objects. The position data receiving component receives position data of the objects. The multidimensional indexing component generates multidimensional indices of the objects based on the velocity data and position data. The determining component determines whether there is coordinated motion between objects based on the multidimensional indices.

20 Claims, 13 Drawing Sheets

(56) References Cited

U.S. PATENT DOCUMENTS

2017/0017715 A1    1/2017  Wroblewski

OTHER PUBLICATIONS

Lawder, J. K., The Application of Space-Filling Curves t . . . , Ph.D. thesis, School of Computer Science and Information Systems, Birkbeck College, University of London, 2000.
Lawder et al, Using Space-Filling Curves for Multi-Dimensional Indexing, Proceedings of the 17th British National Conference on Databases, vol. 1832, pp. 20-35, Jul. 2000.
Chang et al., "Bigtable: A Distributed Storage System for Structured Data," Proceedings of OSDI'06: Seventh Symposium on Operating System . . . , Seattle, WA, Nov. 2006.
http://hbase.apache.org/, access date: Apr. 19, 2017.
http://cassandra.apache.org/, access date: Apr. 19, 2017.
https:/accumulo.apache.org/, access date: Apr. 19, 2017.
Punnoose et al., "Rya: A Scalable RDF Triple Store for the Clouds", Proc. 1st Intl. Workshop on Cloud Intelligence, Aug. 2012.
Lawder, "The Application of Space-Filling Curves to the Storage and Retrieval of . . . ", PH.D thesis, School of Com . . . Birkbeck College, University of London, 2000.
Liao et al., "Multi-dimensional Index on Hadoop Distributed File System," 2010 Fifth IEEE Int. Conf. on Networking, Architecture, and Storage.
Fox et al., "Spatio-temporal Indexing in Non-relational Distributed Databases", IEEE Big Data 2013.
Wroblewski, "Semantic Indexing of Big Data . . . ," Proceeding of the Int. Conf. on Advances in Big Data Analytics, ABDA'14, pp. 226-232, Jul. 2014.
Wroblewski, "Performance of and Approximate, . . . ," Proceedings of the Int. Conf. on Advances in Big Data Analytics, ABDA'15, Jul. 2015.

* cited by examiner

| | INDEX 1 | INDEX 2 | △INDEX | △INDEX (BASE 2) |
|---|---|---|---|---|
| TIME 1 | 21 | 29 | 8 | 0001000 |
| TIME 2 | 29 | 53 | 14 | 0001110 |
| TIME 3 | 53 | 61 | 8 | 0001000 |
| TIME 4 | 61 | 149 | 88 | 1011000 |
| TIME 5 | 149 | 157 | 8 | 0001000 |

FIG. 6

METHOD AND IMPLEMENTATION TO DETECT COORDINATED MOTIONS OF MULTIPLE ENTITIES

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 3600, San Diego, Calif., 92152; telephone (619)553-5118; email: ssc_pac_t2@navy.mil. Reference Navy Case No. 104,130.

BACKGROUND OF THE INVENTION

Embodiments of the invention relate to efficient detection of multiple entities with coordinated motion against a densely populated background.

The detection of multiple entities displaying coordinated motion, e.g. two ships shadowing or convoying, in the clutter of a large population of other entities is an important problem. The positions and velocities of these entities may be observed over long periods of time, and often asynchronously with different frequencies and from different sensors. The databases of these observations can contain billions of records.

There exists a need for a system to efficiently detect multiple entities with coordinated motion in large databases.

SUMMARY OF THE INVENTION

An aspect of the present invention is drawn to a system for determining coordinated motion between a first object and a second object. The system includes a velocity data receiving component, a position data receiving component, a multi-dimensional indexing component and a determining component. The velocity data receiving component receives first velocity data associated with the first object at a first time, receives second velocity data associated with the second object at the first time, receives third velocity data associated with the first object at a second time and receives fourth velocity data associated with the second object at the second time. The position data receiving component receive first position data associated with the first object at the first time, receives second position data associated with the second object at the first time, receives third position data associated with the first object at the second time and receives fourth position data associated with the second object at the second time. The multidimensional indexing component generates a first multidimensional index related to the first object at the first time, generates a second multidimensional index related to the second object at the first time, generates a third multidimensional index related to the first object at the second time and generates a fourth multidimensional index related to the second object at the second time. The determining component determines whether the second object has coordinated motion with respect to the first object based on the first multidimensional index, the second multidimensional index, the third multidimensional index and the fourth multidimensional index.

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 6 illustrates indices pertaining to two ships in coordinated motion;

DETAILED DESCRIPTION OF THE EMBODIMENTS

Figure 1:
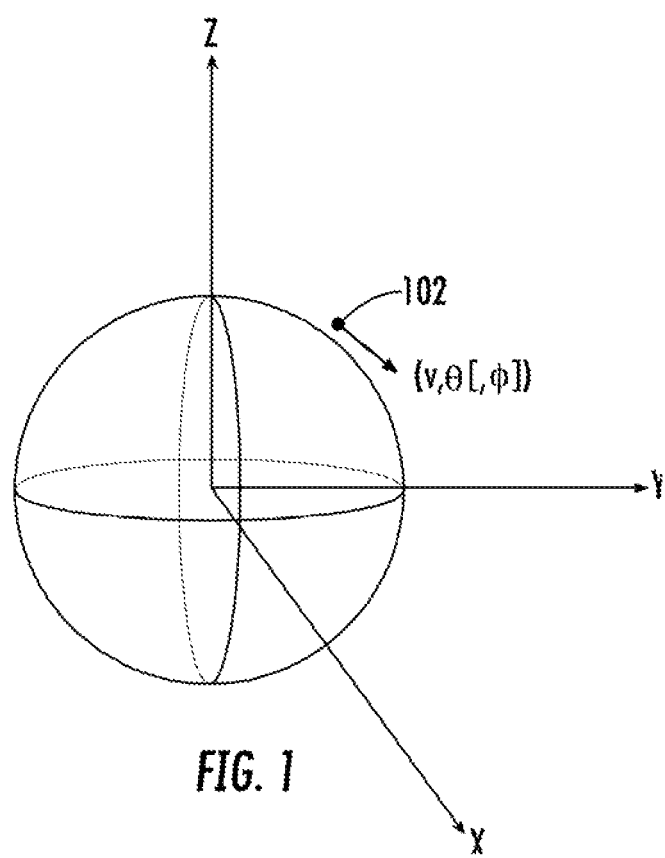
FIG. 1 illustrates a ship with position and velocity vectors.

The present invention provides a system for the efficient detection of coordinated motion of multiple entities.

An aspect of the present invention is drawn to a system for detecting of multiple entities displaying coordinated motion. Multidimensional indexing is used to index and sort n-dimensional datasets. Various thresholds are then applied to the multidimensional indices to detect coordinated motion.

The detection of multiple entities displaying coordinated motion within the clutter of a large population of other entities is an important problem. An example of this kind of task is the detection of two ships that are convoying or shadowing each other, within the dataset for all ships in a given area. The positions and velocities of each ship may be many series of observations over time, and are often provided asynchronously with different frequencies and from different sensors. Datasets of these observations can contain billions of records and can be considered in the realm of "big data."

Prior art methods to detect coordinated motion often consist of brute-force algorithms that compare these sequences on a pair-by-pair basis, which is an Order($N^2$) method and which is not suited to scaling to big data. Furthermore, the asynchronous nature of the sequences can be a computationally intensive method for the more basic comparison algorithms.

Aspects of the present invention exploit the fact that coordinated motion may be determined if entities have state space values (position vector, velocity vector, time) that are similar over extended periods of time. Formally, such a 7-dimensional space is transformed into a multi-dimensional index using space-filling curves. Vectors do not depend upon any particular coordinate system, nor does the indexing depend on a particular choice of space-filling curve.

An example method of determining coordinated motion of at least two objects, in accordance with aspects of the present invention includes choosing a multi-dimensional indexing scheme, for example, one based on Morton curves. Then a coordinate system is chosen for the position vector, for example, a Euclidean geo-centric system based on WGS84 conventions. The a coordinate system is chosen for the velocity vector, for example, exploiting a characteristic of (nearly) surface-bound entities having velocities mostly in the plane defined by the local normal, e.g. collapse the three formal dimensions of velocity to two practical components. Further, in some embodiments, a reduction of dimensionality from an 'extended period of time' constraint is practical for all Earth vehicles including planes, helicopters, and even satellites.

In accordance with another example embodiment, or a fast method of determining coordinated motion of at least two objects, efficiency can be improved by scaling the state-space components using canonical values, i.e., making expected search boxes approximately 'square'. Although this is not necessary, such scaling makes the thresholding easier to interpret and define.

A system that can efficiently detect coordinated motion of multiple entities will now be discussed with reference to FIGS. 1-8 in accordance with aspects of the present invention.

FIG. 1 illustrates a ship with position and velocity vectors.

As shown the figure, the motion of ship 102 may be described by a position vector with x, y, and z components; and by a velocity vector with heading and speed components. The position and velocity vectors both vary with time. These six dimensions, $x_{position}$, $y_{position}$, $z_{position}$, $x_{heading}$, $y_{heading}$ and $z_{heading}$, provide a description of the motion of ship 102.

A reduction of dimensions may be done to facilitate the analysis of the problem; that is, the motion of ship 102 will now be considered in one-dimensional position, one-dimensional speed, and time.

The motion of ship 102 will now be discussed with reference to FIG. 2.

Figure 2:
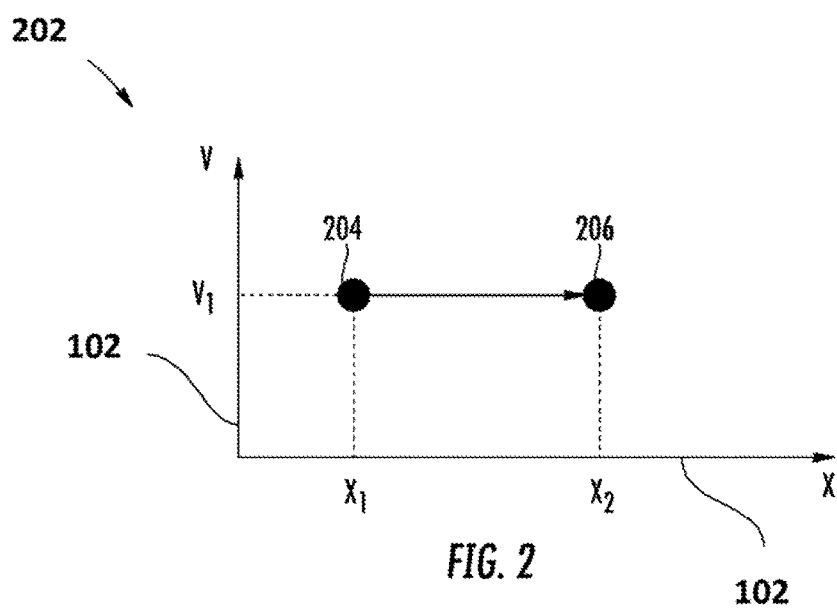
FIG. 2 illustrates a state space graph of position versus speed.

FIG. 2 illustrates a state space graph that plots the motion of ship 102 with respect to position, speed, and time.

As shown in the figure, state space graph 202 consists of two axes. The horizontal axis describes the position of ship 102 in one dimension. The vertical axis describes the speed of ship 102.

At coordinate 204, ship 102 is at position $x_1$ and has a speed of $v_1$. At coordinate 206, which occurs at a later point in time compared to coordinate 204, ship 102 is at position $x_2$ and has the same speed of $v_1$.

Motion of several ships will now be discussed with reference to FIGS. 3A-B.

Figure 3A:
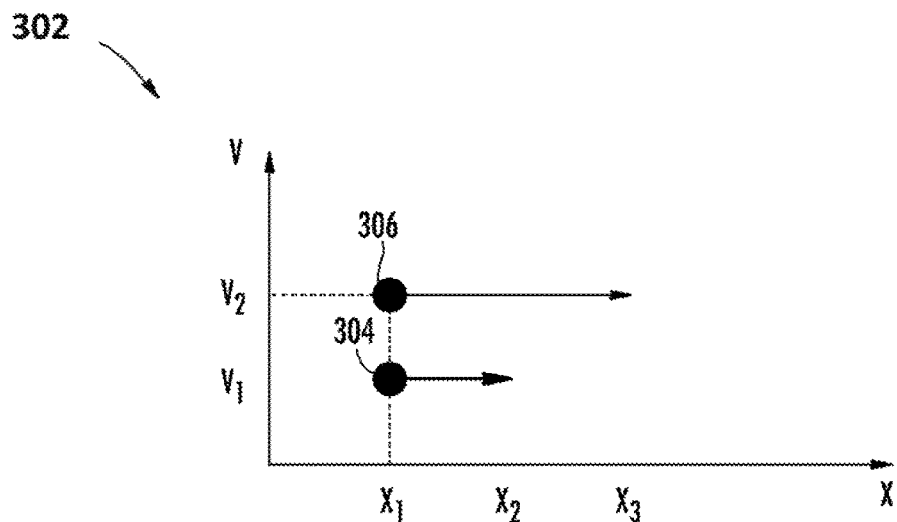
FIGS. 3A-B illustrate two ships in divergent and coordinated motion, respectively.
Figure 3B:
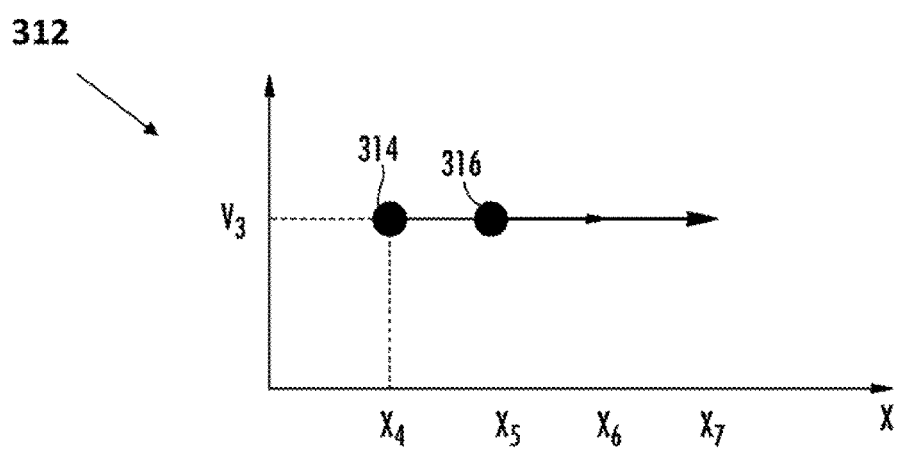

FIGS. 3A-B illustrate two ships in divergent and coordinated motion, respectively.

As shown in FIG. 3A, state space graph 302 illustrates ships 304 and 306 in divergent motion.

At a first point in time, ship 304 is at position $x_1$ and moving at speed $v_1$. At that first point in time, ship 306 is also at position $x_1$ but moving at speed $v_2$. At a second point in time, ship 304 is at position $x_2$ and still moving at speed $v_1$. At that second point in time, ship 306 is at position $x_3$ and moving at speed $v_2$.

As shown in FIG. 3B, state space graph 312 illustrates ships 314 and 316 in coordinated motion.

At a first point in time, ship 314 is at position $x_4$ and ship 316 is at position $x_5$. At a second point in time, ship 314 is at position $x_6$ and ship 316 is at position $x_7$. Both ships 314 and 316 maintain speed $v_3$.

Referring to FIG. 3A, ships 304 and 306 are said to be in divergent motion because the distance between them increases over time, i.e. $x_3-x_2$ is greater than $x_2-x_1$. Returning to FIG. 3B, ships 314 and 316 are said to be in coordinated motion because the distance between them remains constant over time, i.e. $x_7-x_6$ is equal to $x_5-x_4$.

Referring to FIG. 1, a database that includes many ships, with six dimensions of data per ship observed over a long period of time, may grow to be quite large. Efficient search and retrieval of this data is facilitated by efficient indexing keys, often by merging multiple keys into a single indexing key. A way of forming a multidimensional index is by using a space-filling curve to map discrete points in an n-dimensional volume into a one-dimensional series.

One method of mapping an n-dimensional space into a one-dimensional series will now be discussed with reference to FIG. 4.

Figure 4:
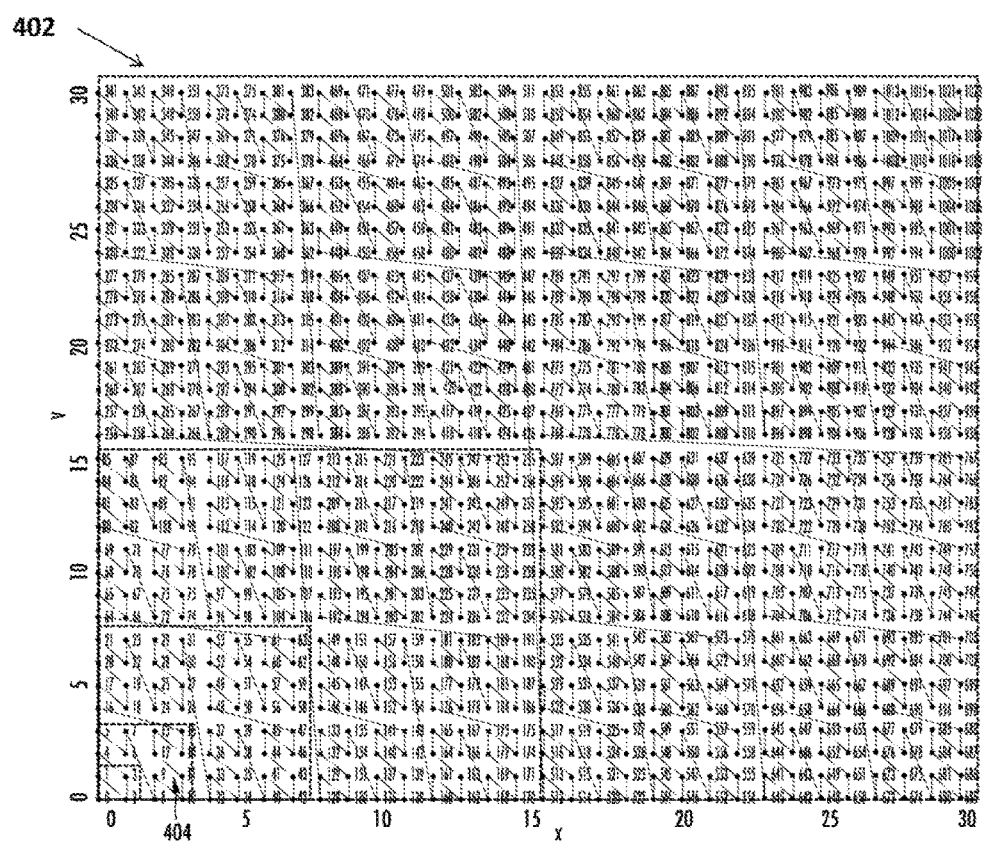
FIG. 4 illustrates multidimensional indexing.

FIG. 4 illustrates a multidimensional indexing of an x-v state space.

As shown in the figure, state space 402 is traversed by multidimensional index 404.

A state space is a set of position and speed vectors as a function of time; in this non-limiting example, state space 402 is a two-dimensional graph that describes the relationship between x (position) and v (speed) as a function of t (time).

Multidimensional index 404 is formed by traversing state space 402 with a space-filling curve. In this non-limiting example, multidimensional index 404 is a Z-order curve, also known as a Morton curve. Other examples of space-filling curves include Hilbert curves and Gray-code curves. A space-filling curve maps discrete points of an n-dimensional volume into a one-dimensional series. A useful property of such space-filling curves is that entries that are close in n-dimensional space will be, on average, close in the one-dimensional series.

Multidimensional index 404 may be stored as any known type of data structure, a non-limiting example of which may be an i×j array, wherein i and j are integers greater than zero (0).

Motion of two ships in state space will now be discussed with reference to FIGS. 5A-E.

FIGS. 5A-E illustrate two ships in coordinated motion through five points in time.

Figure 5A:
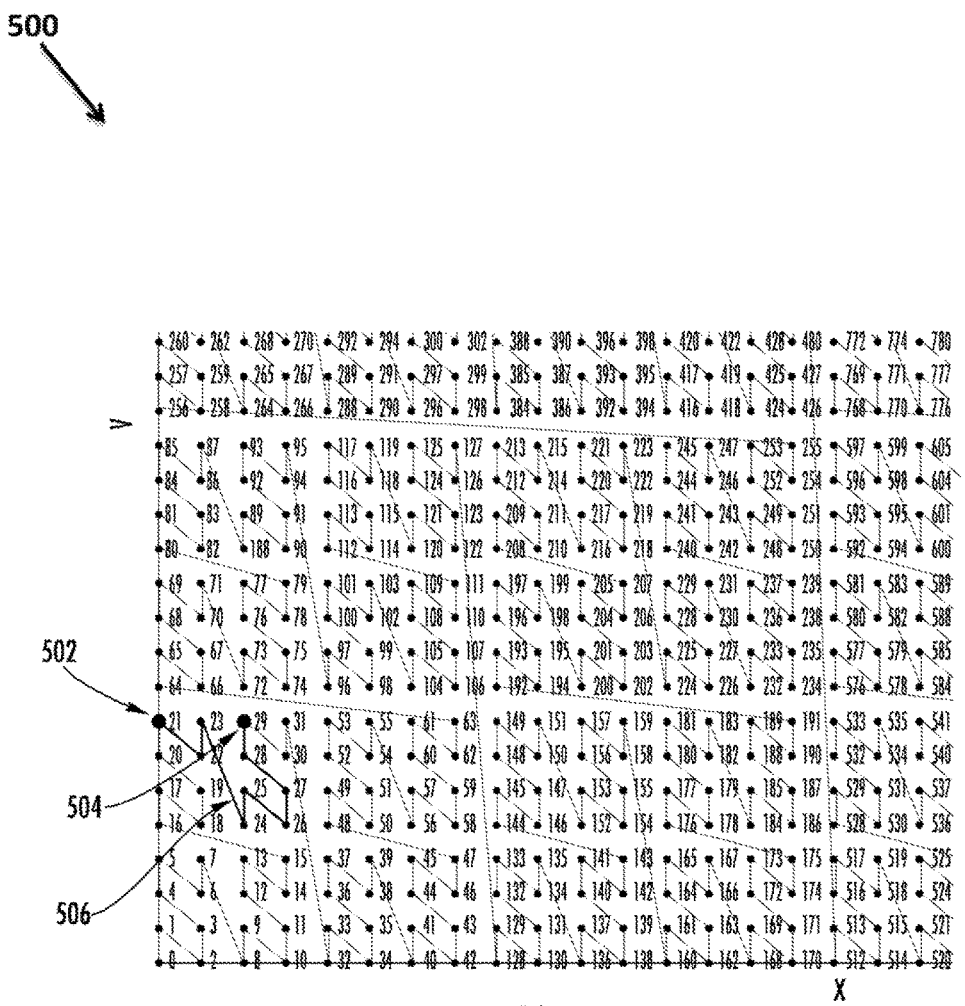
FIGS. 5A-E illustrate two ships in coordinated motion through five time instances.

As shown in FIG. 5A, a first ship and a second ship are described in state space 500.

The first ship is at a position 502 of coordinate (0, 7) in state space 500. That is, the first ship is at position 0 and moving at speed 7 at time 1. The second ship is at a position 504 of coordinate (2, 7) in state space 500. That is, the second ship is at position 2 and moving at speed 7 at time 1. The difference between the indices of the first ship and the second ship is highlighted as path 506.

Figure 5B:
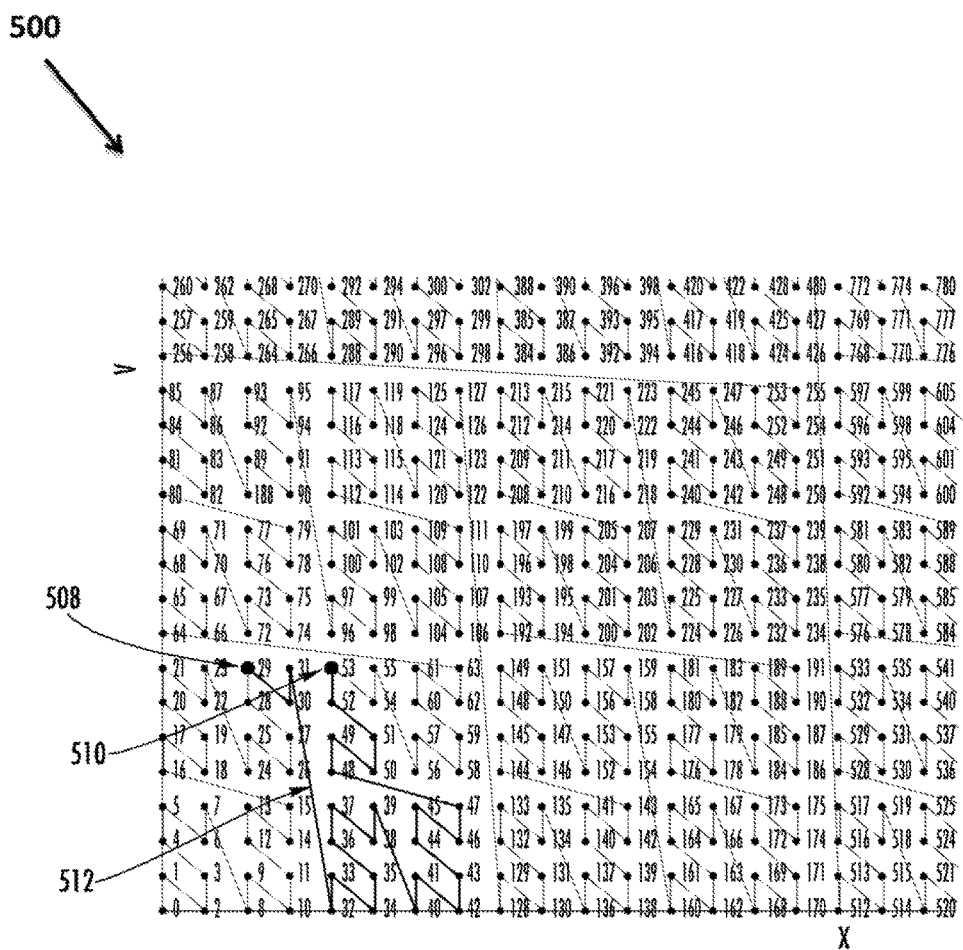

As shown in FIG. 5B, the first ship has moved to a position 508 of coordinate (2, 7) in state space 500. That is, the first ship is at position 2 and moving at speed 7 at time 2. The second ship is at a position 510 of coordinate (4, 7) in state space 500. That is, the second ship is at position 4 and moving at speed 7 at time 2. The difference between the indices of the first ship and the second ship is highlighted as path 512. Here, the speed of each of the ships remains constant at 7.

Figure 5C:
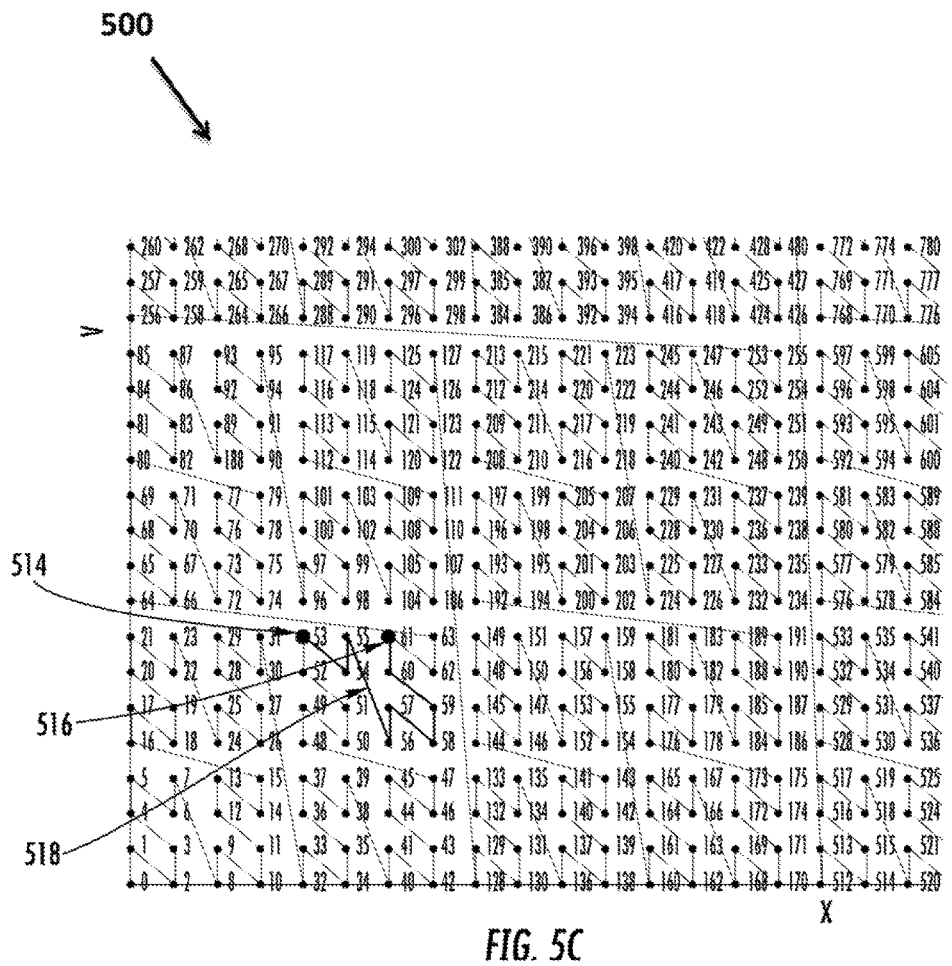

As shown in FIG. 5C, the first ship has moved to a position 514 of coordinate (4, 7) in state space 500. That is, the first ship is at position 4 and moving at speed 7 at time 3. The second ship is at a position 516 of coordinate (6, 7) in state space 500. That is, the second ship is at position 6 and moving at speed 7 at time 3. The difference between the indices of the first ship and the second ship is highlighted as path 518. Their speeds remain constant at 7.

Figure 5D:
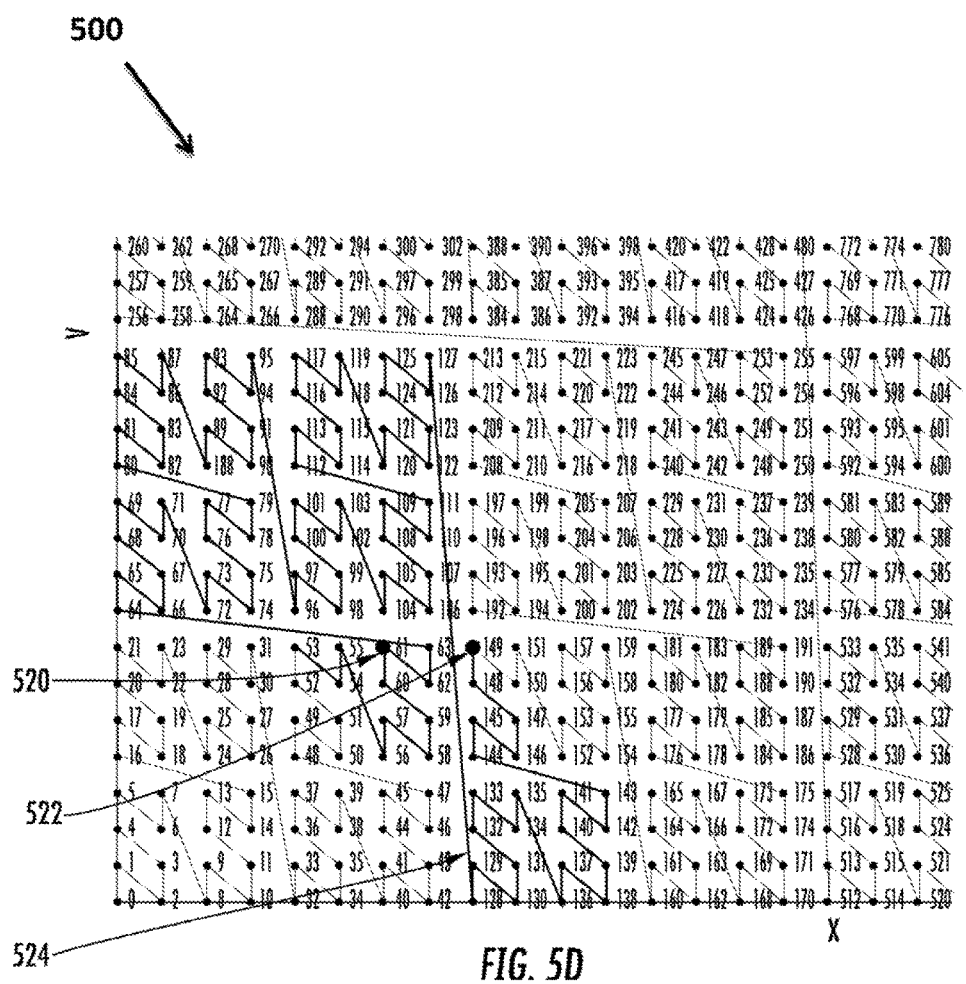

As shown in FIG. 5D, the first ship has moved to a position 520 of coordinate (6, 7) in state space 500. That is, the first ship is at position 6 and moving at speed 7 at time 4. The second ship is at a position 522 of coordinate (8, 7) in state space 500. That is, the second ship is at position 8 and moving at speed 7 at time 4. The difference between the indices of the first ship and the second ship is highlighted as path 524. Their speeds remain constant at 7.

Figure 5E:
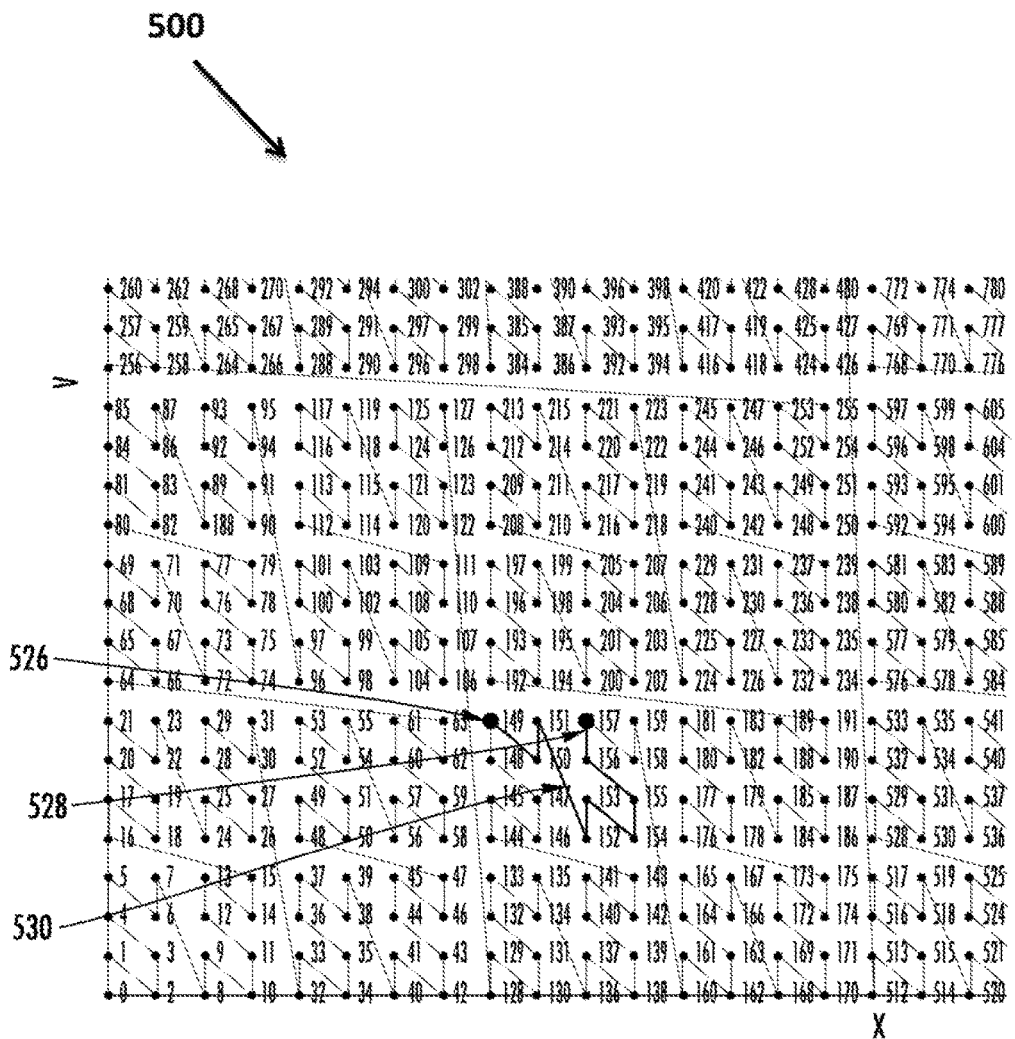

As shown in FIG. 5E, the first ship has moved to a position 526 of coordinate (8, 7) in state space 500. That is, the first ship is at position 8 and moving at speed 7 at time 5. The second ship is at a position 528 of coordinate (10, 7) in state space 500. That is, the second ship is at position 10 and moving at speed 7 at time 5. The difference between the indices of the first ship and the second ship is highlighted as path 530. Their speeds remain constant at 7.

As shown in FIGS. 5A-E, the difference in multidimensional indices between the two ships is described by the respective highlighted paths. The length of paths varies at different points in time.

Changes to the values of multidimensional index 404 will now be discussed with reference to FIG. 6.

As shown in FIG. 6, indices 1 and 2 and their difference are tabulated against time.

Index 1 is the numerical value of multidimensional index 404 for the first ship. Index 2 is the numerical value of multidimensional index 404 for the second ship.

Prior art methods for detecting coordinated motion between two ships often relied on brute-force search algorithms operating in state space, with Order($N^2$) complexity. An efficient method for detecting coordinated motion using multidimensional indexing will now be discussed with reference to FIGS. 7-9 in accordance with aspects of the present invention.

Figure 7:
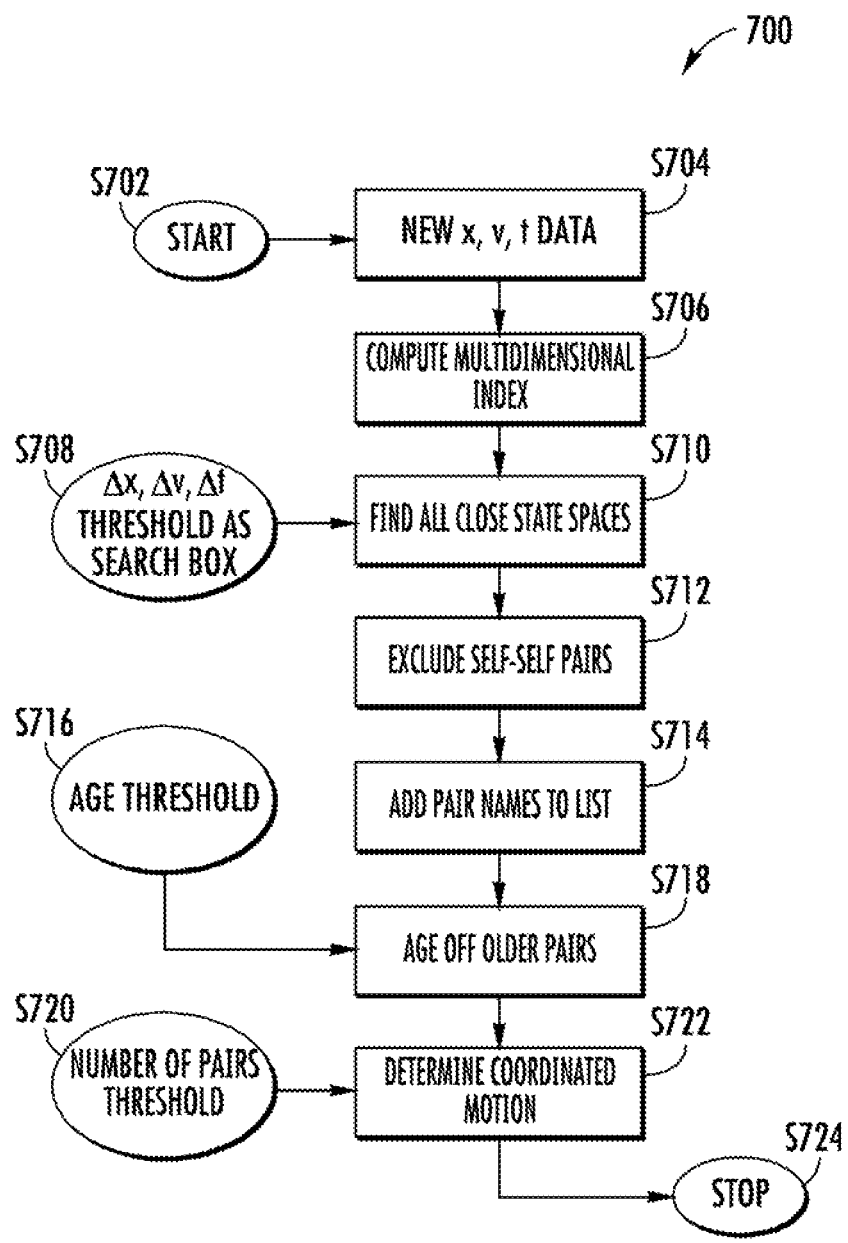
FIG. 7 illustrates a comprehensive method for detecting two ships in coordinated motion in accordance with aspects of the present invention.
Figure 8:
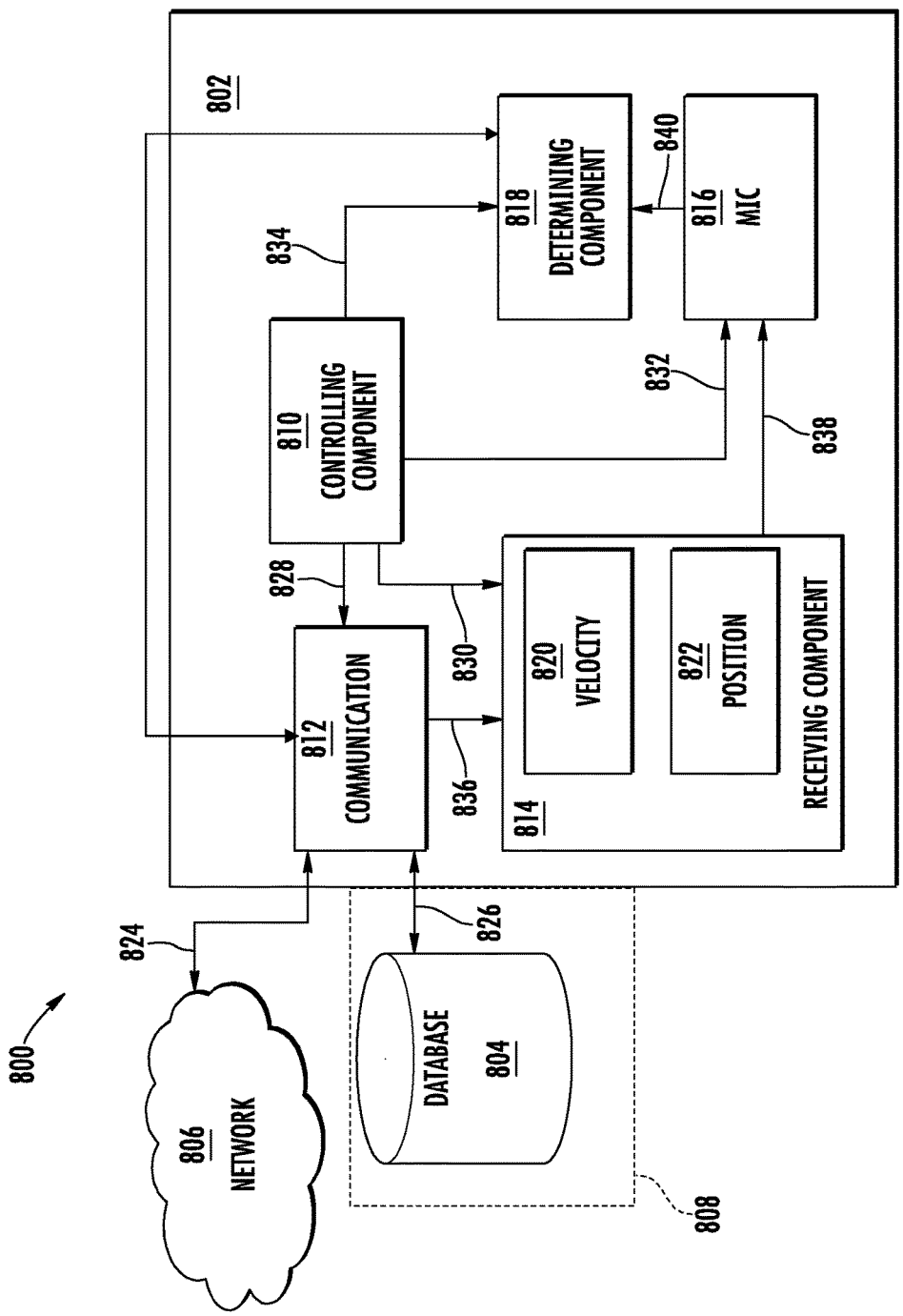
FIG. 8 illustrates an example system in accordance with aspects of the present invention.
Figure 9:
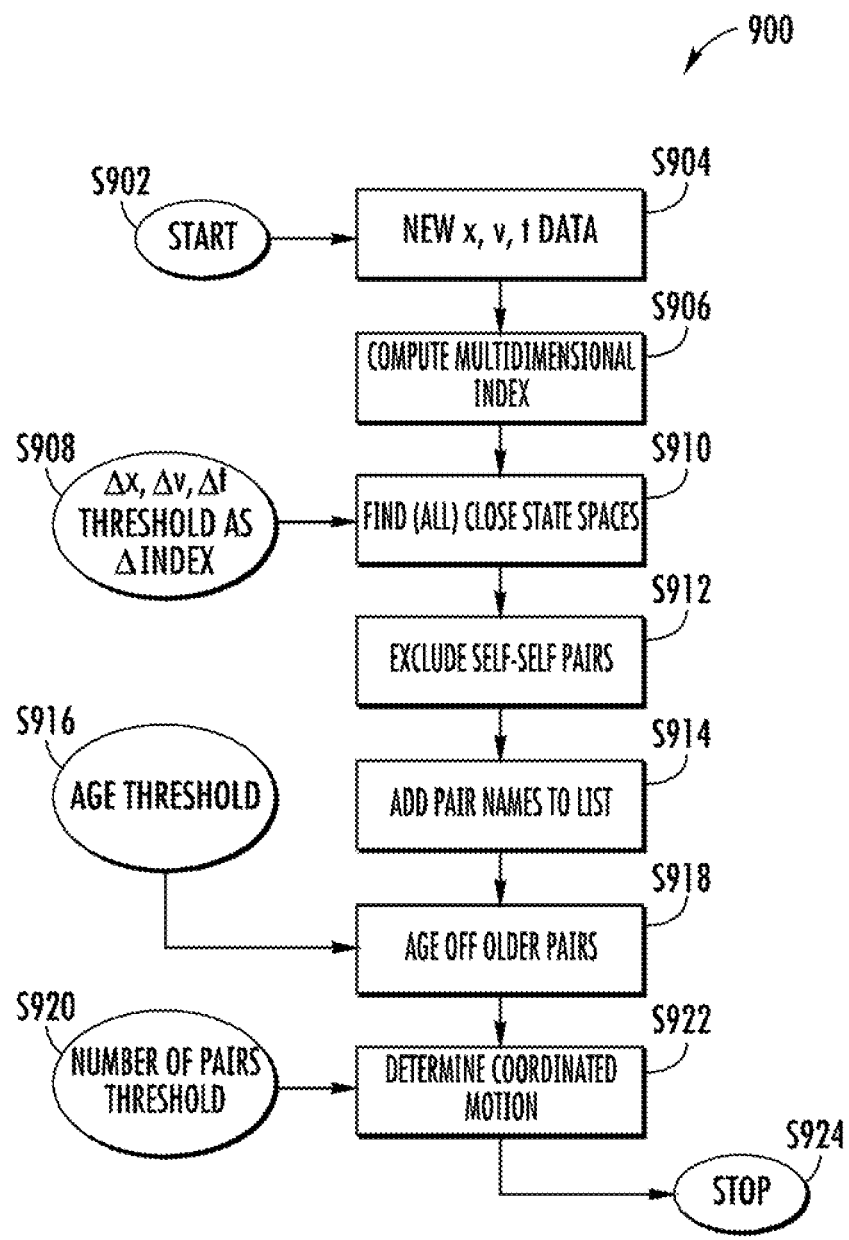
FIG. 9 illustrates a fast method for detecting two ships in coordinated motion in accordance with aspects of the present invention.

FIGS. 7-9 illustrate a system and methods for detecting coordinated motion between two ships using multidimensional indexing.

FIG. 7 illustrates a comprehensive method for detecting coordinated motion between two ships using multidimensional indexing, in accordance with aspects of the present invention.

In this non-limiting example, and with reference to FIG. 4, method 700 is described for a two-dimensional state space graph that relates x (position) and v (speed) as a function of t (time). Method 700 may be extended without limitation to n-dimensional datasets.

Method 700 starts (S702), and state space data is collected (S704). For example, satellite imagery or radar data may provide position and velocity data of a set of objects, e.g., ships, within an area of interest, e.g., a portion of an ocean. This will be further described with additional reference to FIG. 8.

FIG. 8 illustrates an example system 800 in accordance with aspects of the present invention.

As shown in FIG. 8, system 800 includes a system 802, a database 804 and a network 806. In this example embodiment, system 802 and database 804 are distinct elements. However, in some embodiments, system 802 and database 804 may be a unitary device as indicated by dotted line 808.

System 802 includes a controlling component 810, a communication component 812, a data receiving component 814, a multidimensional indexing component (MIC) 816 and a determining component 818. System 802 is operable to determine coordinated motion between objects.

In this example, controlling component 810, communication component 812, data receiving component 814, MIC 816 and determining component 818 are illustrated as individual devices. However, in some embodiments, at least two of controlling component 810, communication component 812, data receiving component 814, MIC 816 and determining component 818 may be combined as a unitary device. Further, in some embodiments, at least one of controlling component 810, communication component 812, data receiving component 814, MIC 816 and determining component 818 may be implemented as a processor or a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Data receiving component 814 includes a velocity data receiving component 820 and a position data receiving component 822.

In this example, velocity data receiving component 820 and position data receiving component 822 are illustrated as individual devices. However, in some embodiments, velocity data receiving component 820 and position data receiving component 822 may be combined as a unitary device. Further, in some embodiments, at least one of velocity data receiving component 820 and position data receiving component 822 may be implemented as a processor or a computer having tangible computer-readable media for carrying or having computer-executable instructions or data structures stored thereon.

Communication component 812 is arranged to communicate with network 806 via a communication channel 824 and with database 804 via a communication channel 826. Communication component 812 is operable to communicate with network 806 and database 804.

Controlling component 810 is arranged to communicate with: communication component 812 via a communication channel 828; data receiving component 814 via a communication channel 830; MIC 816 via a communication channel 832; and determining component 818 via a communication channel 834. Controlling component 810 is operable to control each of communication component 812, data receiving component 814, MIC 816 and determining component 818.

Data receiving component 814 is additionally arranged to communicate with communication component 812 via a communication channel 836. Data receiving component 814 is operable to receive data associated with objects. In a non-limiting example embodiment, data receiving component 814 is operable to receive position data associated with positions of a plurality of objects and velocity data associated with velocities of the plurality of objects. In this example embodiment, velocity data receiving component 820 is operable to receive the velocity data associated with the velocity of a plurality of objects at different times, whereas position data receiving component 822 is operable to receive the position data associated with the position of the plurality of objects at the different times.

MIC 816 is additionally arranged to communicate with determining component 818 via a communication channel 840. MIC 816 is operable to a multidimensional index related to each object at each time, wherein the multidimensional index is derived from the velocity and position data of a respective object.

Determining component 818 is operable to determine whether there is coordinated motion between at least two objects, of the plurality of objects, based on the multidimensional indices created by MIC 816. Determining component 818 stores and retrieves the MIC-produced state-space indexes when dealing with big data. A bidirectional channel exists between communication component 812 and determining component 818 to allow communication component 818 to communicate with database 804. If database 804 is an external, distributed database, then going through communications component 812 for retrieval is required.

Communication channels 824, 826, 828, 830, 832, 834, 836, 838 and 840 may be any known type of communication channel, non-limiting examples of which include wireless and hard wired communication channels.

In operation, communication component 812 obtains data associated with objects being monitored for coordinated motion. For purposes of discussion, consider the example where two ships are being monitored for coordinated motion in the ocean.

In this example, the obtained data includes velocity and position data for each ship at predetermined times. In some embodiments, this data is obtained from network 806 via communication channel 824. For example, a third party provides such data as acquired by satellite of radar to system 802. In other embodiments, the data is obtained from database 804 via communication channel 826.

Communication component 812 then provides the data associated with the objects being monitored for coordinated motion to data receiving component 814 via communication channel 836. In this example embodiment, the velocity data of the two ships is provided to velocity data receiving component 820, whereas the position data of the two ships is provided to position data receiving component 822. In this example embodiment, the state space of the ships is the velocity and position of the ships at different times.

Returning to FIG. 7, after the state space data is collected (S704), the multidimensional index is then computed (S706). For example, as shown in FIG. 8, data receiving component 814 provides the velocity and position data for each ship at each time to MIC 816.

MIC 816 then generates a multidimensional index by any known method, a non-limiting example of which includes a Z-order curve as discussed above with reference to FIGS. 5A-E.

Returning to FIG. 7, after the multidimensional index is computed (S706), for each ship, the multidimensional index is searched to find nearby entries (S710) within a bounding box whose size in state space is given by predetermined threshold values for $\Delta x$, $\Delta v$, and $\Delta t$ (S708).

For example, as shown in FIG. 8, MIC 816 provides the multidimensional indices to determining component 818. Determining component 818 has stored therein, threshold values for $\Delta x$, $\Delta v$, and $\Delta t$.

The threshold value for $\Delta x$, determines how close the ships must be to one another to be of interest. For example, for purposes of discussion, let $\Delta x$ be two (2) nautical miles. In the case where a multidimensional index indicates that one ship is separated from the other ship by three (3) nautical miles, then that multidimensional index would be ignored. On the other hand, the case where a multidimensional index indicates that one ship is separated from the other ship by one (1) nautical mile, then that multidimensional index would be retained as a possible candidate to indicate coordinated motion between the two ships.

The threshold value for $\Delta v$, determines how close the velocity of the ships must be to one another to be of interest. For example, for purposes of discussion, let $\Delta v$ be five (5) nautical miles/hour (hr). In the case where a multidimensional index indicates that one ship is traveling at twenty-one (21) nautical miles/hr, whereas the other ship is traveling at ten (10) nautical miles/hr, then that multidimensional index would be ignored. On the other hand, the case where a multidimensional index indicates that one ship is traveling at twenty-one (21) nautical miles/hr, whereas the other ship is traveling at eighteen (18) nautical miles/hr, then that multidimensional index would be retained as a possible candidate to indicate coordinated motion between the two ships.

The threshold value for $\Delta t$, determines the time proximity of the ships to be of interest. For example, for purposes of discussion, let $\Delta t$ be one (1) day. In the case where a multidimensional index indicates that one ship is located at a position and traveling at a velocity that is similar (within $\Delta x$ and $\Delta v$ discussed above) to that of the other ship, three (3) days after the other ship was located at that position with that velocity, then that multidimensional index would be ignored. On the other hand, the case where a multidimensional index indicates that one ship is located at a position and traveling at a velocity that is similar (within $\Delta x$ and $\Delta v$ discussed above) to that of the other ship, only ten (10) hours after the other ship was located at that position with that velocity, then that multidimensional index would be retained as a possible candidate to indicate coordinated motion between the two ships.

Determining component 818 is therefore able to eliminate any multidimensional index between the two ships that falls below the threshold values for $\Delta x$, $\Delta v$, and $\Delta t$. For example, returning to FIGS. 5A-5E, let the $\Delta x$, $\Delta v$ thresholds determine the difference between the indices, which determines the length of the paths. In particular, for purposes of discussion, let the $\Delta x$, $\Delta v$ thresholds be set such that the length of path 506 of FIG. 5A, the length of path 518 of FIG. 5C and the length of path 530 of FIG. 5E are accepted, whereas the length of path 512 of FIG. 5B and the length of path 524 of FIG. 5D are rejected.

In this manner, indices of FIGS. 5A, C and E associating the first ship and the second ship are used to create a list. For example, as discussed above with reference to FIG. 6, the indices of the two ships from FIGS. 5A, C and E are tabulated against time.

Effectively, determining component 818 searches for clusters in the multdimensional index and is of Order(N log/V) complexity.

Returning to FIG. 7, after the multidimensional index is searched to find nearby entries (S710), each pair of entries is then filtered to remove self-self pairs (S712), i.e. two entries that are the identical ship at identical positions and speeds at the same point in time. For example, as shown in FIG. 8, determining component 818 will remove any entries of a ship having identical positions and speeds. This will remove, for example, water taxis that take cycles through prescribed routes.

Returning to FIG. 7, after each pair of entries is then filtered to remove self-self pairs (S712), filtered pairs are then added to a list (S714). For example, as shown in FIG. 8, determining component 818 adds any ships that have corresponding indices. In this example, there are only two ships under consideration. However, it should be noted that this method may be applied to multiple objects over long periods of time. As such, determining component 818 may continuously update the list for coordinated motion between n objects.

Returning to FIG. 7, after filtered pairs are then added to a list (S714), an age threshold (S716) is then applied to remove older pairs (S718). For example, as shown in FIG. 8, determining component 818 additionally has stored therein, threshold values for age.

The threshold value for age determines a time period for which a series of indices may be considered.

In this non-limiting example, the age threshold may be set to one day; that is, two ships following the same path but one month apart are deemed to not be convoying with each other.

At this point, the close-entity list may contain data for ships that are only coincidentally close for a short period of time, such as when one or both are maneuvering. The criterion for coordinated motion specifies that the ships are close over an extended period of time. Thus, the close-entity list is again filtered to determine true coordinated motion (S722) using a threshold based on number of pairs (S720).

After determining the entries that correspond to coordinated motion, method 700 ends (S724).

Method 700 is guaranteed to find all desired values within the bounding box in state space specified by thresholds $\Delta x$, $\Delta v$, and $\Delta t$. Method 700 is of Order(N log N) complexity and is an improvement over the Order($N^2$) complexity of brute-force search methods. A method to further improve on efficiency will now be discussed with reference to FIG. 9.

FIG. 9 illustrates a fast method for detecting coordinated motion between two ships using multidimensional indexing, in accordance with aspects of the present invention.

In this non-limiting example, and with reference to FIG. 4, method 900 is described for a two-dimensional state space graph that relates x (position) and v (speed) as a function of t (time). Method 900 may be extended without limitation to n-dimensional datasets.

Method 900 starts (S902) with the collection of state space data (S904). The multidimensional index is computed (S906).

Referring to FIGS. 5A-E, it is observed that the two ships are always the same x distance from each other. The length of paths 506, 518 and 530 are similar, as shown in FIGS. 5A, C and E. The lengths of paths 512 and 524, as shown in FIGS. 5B and D correspond to the indices of two ships crossing bit boundaries in the multidimensional index.

Referring to FIG. 6, it is observed that $\Delta$index has a value of 8 most of the time, except when the two ships cross bit boundaries.

Returning to FIG. 9, this observation is exploited in a search of multidimensional index 404 to find close indices (S910) by using a threshold of $\Delta$index (S908) instead of a bounding box discussed above with reference to method 700 (S708). $\Delta$index is determined to be a value that indicates closeness of the two ships, but may be smaller than the jump in values that occur when the two ships cross bit boundaries.

Each pair of entries is then filtered to remove self-self pairs (S912), i.e. two entries that are the identical ship at identical positions and speeds at the same point in time. Filtered pairs are then added to a list (S914).

An age threshold (S916) is then applied to remove older pairs (S918). In this non-limiting example, the age threshold may be set to one day; that is, two ships following the same path but one month apart are deemed to be not convoying with each other.

At this point, the close-entity list may contain data for ships that are only coincidentally close for a short period of time, such as when one or both are maneuvering. The criterion for coordinated motion specifies that the ships are close over an extended period of time. Thus, the close-entity list is again filtered to determine true coordinated motion (S922) using a threshold based on number of pairs (S920).

After determining the entries that correspond to coordinated motion, method 900 ends (S924).

Method 700 is a comprehensive method that detects all paired entities within a bounding box defined by $\Delta x$, $\Delta v$, and $\Delta t$ in state space. Method 900 is a fast method that detects paired entities defined by a $\Delta$index threshold along the multidimensional index. Method 900 may exclude some paired entries that are found by method 700; however, in long temporal sequences, it is not necessary to retrieve all of the close entries, as bit boundary transitions are relatively few compared to the number of closely-paired entries that are smaller than the $\Delta$index threshold. Method 700 is of Order(N log N) complexity, while method 900 is of Order (log N) complexity.

In summary, the detection of multiple entities displaying coordinated motion within the clutter of a large population of other entities is an important problem. An example of this kind of task is the detection of two ships that are convoying or shadowing each other, within the dataset for all ships in a given area. Prior art methods to detect coordinated motion often consist of brute-force algorithms that compare these sequences on a pair-by-pair basis, which is an Order($N^2$) method and which is not suited to scaling to big data.

The invention presents a system of using multidimensional indexing to efficiently index, sort, and detect coordinated motion of entities. The invention offers greatly increased efficiency over prior art methods and is easily extended to large or distributed datasets.

Coordinated motion of ships is described in the example embodiments above. However, these are non-limiting example embodiments for purposes of explanation only. It should be noted that coordinated motion of any type of moving entities, such as for example any type of vehicles, may be determined in accordance with aspects of the present invention. Other non-limiting examples of coordinated motion of entities may include helicopters or drones following a car or a person in an urban setting.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for determining coordinated motion between a first object and a second object, said system comprising:
   a velocity data receiving component operable to receive first velocity data associated with the first object at a first time, to receive second velocity data associated with the second object at the first time, to receive third velocity data associated with the first object at a second time and to receive fourth velocity data associated with the second object at the second time;
   a position data receiving component operable to receive first position data associated with the first object at the first time, to receive second position data associated with the second object at the first time, to receive third position data associated with the first object at the second time and to receive fourth position data associated with the second object at the second time;

a multidimensional indexing component operable to generate a first multidimensional index related to the first object at the first time, to generate a second multidimensional index related to the second object at the first time, to generate a third multidimensional index related to the first object at the second time and to generate a fourth multidimensional index related to the second object at the second time; and a determining component operable to determine whether the second object has coordinated motion with respect to the first object based on the first multidimensional index, the second multidimensional index, the third multidimensional index and the fourth multidimensional index.

2. The system of claim 1,
wherein said multidimensional indexing component is operable to generate the first multidimensional index as a data structure associated with the first velocity data, the first position data, the second velocity data and the second position data, and
wherein said multidimensional indexing component is operable to generate the second multidimensional index as a data structure associated with the third velocity data, the third position data, the fourth velocity data and the fourth position data.

3. The system of claim 2,
wherein said determining component is further operable to establish a predetermined threshold,
wherein said determining component is further operable to generate a multidimensional index comparison based on a difference between the first multidimensional index and the second multidimensional index, and
wherein said determining component is operable to determine whether the second object has coordinated motion with respect to the first object based on a threshold comparison of the predetermined threshold and the multidimensional index comparison.

4. The system of claim 3,
wherein said velocity data receiving component is further operable to receive fifth velocity data associated with the first object at a third time and to receive sixth velocity data associated with the second object at the third time,
wherein said position data receiving component is further operable to receive fifth position data associated with the first object at the third time and to receive sixth position data associated with the second object at the third time,
wherein said multidimensional indexing component is further operable to generate a fifth multidimensional index related to the first object at the third time and to generate a sixth multidimensional index related to the second object at the third time, and
wherein said determining component is further operable to determine whether the second object has coordinated motion with respect to the first object additionally based on the fifth multidimensional index and the sixth multidimensional index.

5. The system of claim 1,
wherein said determining component is further operable to establish a predetermined threshold,
wherein said determining component is further operable to generate a multidimensional index comparison based on a difference between the first multidimensional index and the second multidimensional index, and
wherein said determining component is operable to determine whether the second object has coordinated motion with respect to the first object based on a threshold comparison of the predetermined threshold and the multidimensional index comparison.

6. The system of claim 5,
wherein said velocity data receiving component is further operable to receive fifth velocity data associated with the first object at a third time and to receive sixth velocity data associated with the second object at the third time,
wherein said position data receiving component is further operable to receive fifth position data associated with the first object at the third time and to receive sixth position data associated with the second object at the third time,
wherein said multidimensional indexing component is further operable to generate a fifth multidimensional index related to the first object at the third time and to generate a sixth multidimensional index related to the second object at the third time, and
wherein said determining component is further operable to determine whether the second object has coordinated motion with respect to the first object additionally based on the fifth multidimensional index and the sixth multidimensional index.

7. The system of claim 1,
wherein said velocity data receiving component is further operable to receive fifth velocity data associated with the first object at a third time and to receive sixth velocity data associated with the second object at the third time,
wherein said position data receiving component is further operable to receive fifth position data associated with the first object at the third time and to receive sixth position data associated with the second object at the third time,
wherein said multidimensional indexing component is further operable to generate a fifth multidimensional index related to the first object at the third time and to generate a sixth multidimensional index related to the second object at the third time, and
wherein said determining component is further operable to determine whether the second object has coordinated motion with respect to the first object additionally based on the fifth multidimensional index and the sixth multidimensional index.

8. A method for determining coordinated motion between a first object and a second object, said method comprising:
receiving, via a velocity data receiving component, first velocity data associated with the first object at a first time;
receiving, via the velocity data receiving component, second velocity data associated with the second object at the first time;
receiving, via the velocity data receiving component, third velocity data associated with the first object at a second time;
receiving, via the velocity data receiving component, fourth velocity data associated with the second object at the second time;

receiving, via a position data receiving component, first position data associated with the first object at the first time;

receiving, via the position data receiving component, second position data associated with the second object at the first time;

receiving, via the position data receiving component, third position data associated with the first object at the second time;

receiving, via the position data receiving component, fourth position data associated with the second object at the second time;

generating, via a multidimensional indexing component, a first multidimensional index related to the first object at the first time;

generating, via a multidimensional indexing component, a second multidimensional index related to the second object at the first time;

generating, via the multidimensional indexing component, a third multidimensional index related to the first object at the second time;

generating, via a multidimensional indexing component, a fourth multidimensional index related to the second object at the second time; and determining, via a determining component, whether the second object has coordinated motion with respect to the first object based on the first multidimensional index, the second multidimensional index, the third multidimensional index and the fourth multidimensional index.

9. The method of claim 8, wherein said generating, via a multidimensional indexing component, a first multidimensional index relating the first object at the first time with the second object at the first time comprises generating the first multidimensional index as a data structure associated with the first velocity data, the first position data, the second velocity data and the second position data, and wherein said generating, via the multidimensional indexing component, a second multidimensional index relating the first object at the second time with the second object at the second time comprises generating the second multidimensional index as a data structure associated with the third velocity data, the third position data, the fourth velocity data and the fourth position data.

10. The method of claim 9, further comprising:

establishing, via the determining component, a predetermined threshold; and generating, via the determining component, a multidimensional index comparison based on a difference between the first multidimensional index and the second multidimensional index, and wherein said determining, via a determining component, whether the second object has coordinated motion with respect to the first object based on the first multidimensional index and the second multidimensional index comprises determining whether the second object has coordinated motion with respect to the first object based on a threshold comparison of the predetermined threshold and the multidimensional index comparison.

11. The method of claim 10, further comprising:

receiving, via the velocity data receiving component, fifth velocity data associated with the first object at a third time;

receiving, via the velocity data receiving component, sixth velocity data associated with the second object at the third time;

receiving, via the position data receiving component, fifth position data associated with the first object at the third time;

receiving, via the position data receiving component, sixth position data associated with the second object at the third time;

generating, via the multidimensional indexing component, a fifth multidimensional index related to the first object at the third time; and generating, via the multidimensional indexing component, a sixth multidimensional index related to the second object at the third time, wherein said determining, via a determining component, whether the second object has coordinated motion with respect to the first object based on the first multidimensional index and the second multidimensional index comprises determining whether the second object has coordinated motion with respect to the first object additionally based on the fifth multidimensional index and the sixth multidimensional index.

12. The method of claim 8, establishing, via the determining component, a predetermined threshold; and generating, via the determining component, a multidimensional index comparison based on a difference between the first multidimensional index and the second multidimensional index, and wherein said determining, via a determining component, whether the second object has coordinated motion with respect to the first object based on the first multidimensional index and the second multidimensional index comprises determining whether the second object has coordinated motion with respect to the first object based on a threshold comparison of the predetermined threshold and the multidimensional index comparison.

13. The method of claim 12, receiving, via the velocity data receiving component, fifth velocity data associated with the first object at a third time;

receiving, via the velocity data receiving component, sixth velocity data associated with the second object at the third time;

receiving, via the position data receiving component, fifth position data associated with the first object at the third time;

receiving, via the position data receiving component, sixth position data associated with the second object at the third time; and generating, via the multidimensional indexing component, a fifth multidimensional index related to the first object at the third time; and generating, via the multidimensional indexing component, a sixth multidimensional index related to the second object at the third time, wherein said determining, via a determining component, whether the second object has coordinated motion with respect to the first object based on the first multidimensional index and the second multidimensional index comprises determining whether the second object has coordinated motion with respect to the first object additionally based on the fifth multidimensional index and the sixth multidimensional index.

14. The method of claim 8,
receiving, via the velocity data receiving component, fifth velocity data associated with the first object at a third time;
receiving, via the velocity data receiving component, sixth velocity data associated with the second object at the third time;
receiving, via the position data receiving component, fifth position data associated with the first object at the third time;
receiving, via the position data receiving component, sixth position data associated with the second object at the third time; and
generating, via the multidimensional indexing component, a fifth multidimensional index related to the first object at the third time; and
generating, via the multidimensional indexing component, a sixth multidimensional index related to the second object at the third time,
wherein said determining, via a determining component, whether the second object has coordinated motion with respect to the first object based on the first multidimensional index and the second multidimensional index comprises determining whether the second object has coordinated motion with respect to the first object additionally based on the fifth multidimensional index and the sixth multidimensional index.

15. A system comprising:
a processor for:
receiving, via a velocity data receiving component, first velocity data associated with a first object at a first time;
receiving, via the velocity data receiving component, second velocity data associated with a second object at the first time;
receiving, via the velocity data receiving component, third velocity data associated with the first object at a second time;
receiving, via the velocity data receiving component, fourth velocity data associated with the second object at the second time;
receiving, via a position data receiving component, first position data associated with the first object at the first time;
receiving, via the position data receiving component, second position data associated with the second object at the first time;
receiving, via the position data receiving component, third position data associated with the first object at the second time;
receiving, via the position data receiving component, fourth position data associated with the second object at the second time;
generating, via a multidimensional indexing component, a first multidimensional index related to the first object at the first time;
generating, via a multidimensional indexing component, a second multidimensional index related to the second object at the first time;
generating, via the multidimensional indexing component, a third multidimensional index related to the first object at the second time;
generating, via a multidimensional indexing component, a fourth multidimensional index related to the second object at the second time; and
determining, via a determining component, whether the second object has coordinated motion with respect to the first object based on the first multidimensional index, the second multidimensional index, the third multidimensional index and the fourth multidimensional index.

16. The system of claim 15,
wherein the generating, via a multidimensional indexing component, a first multidimensional index relating the first object at the first time with the second object at the first time comprises generating the first multidimensional index as a data structure associated with the first velocity data, the first position data, the second velocity data and the second position data, and
wherein the generating, via the multidimensional indexing component, a second multidimensional index relating the first object at the second time with the second object at the second time comprises generating the second multidimensional index as a data structure associated with the third velocity data, the third position data, the fourth velocity data and the fourth position data.

17. The system of claim 16, wherein said processor is further for:
establishing, via the determining component, a predetermined threshold; and
generating, via the determining component, a multidimensional index comparison based on a difference between the first multidimensional index and the second multidimensional index, and
wherein the determining, via a determining component, whether the second object has coordinated motion with respect to the first object based on the first multidimensional index and the second multidimensional index comprises determining whether the second object has coordinated motion with respect to the first object based on a threshold comparison of the predetermined threshold and the multidimensional index comparison.

18. The system of claim 17, wherein said processor is further for:
receiving, via the velocity data receiving component, fifth velocity data associated with the first object at a third time;
receiving, via the velocity data receiving component, sixth velocity data associated with the second object at the third time;
receiving, via the position data receiving component, fifth position data associated with the first object at the third time;
receiving, via the position data receiving component, sixth position data associated with the second object at the third time; and
generating, via the multidimensional indexing component, a fifth multidimensional index related to the first object at the third time; and
generating, via the multidimensional indexing component, a sixth multidimensional index related to the second object at the third time,
wherein the determining, via a determining component, whether the second object has coordinated motion with respect to the first object based on the first multidimensional index and the second multidimensional index comprises determining whether the second object has coordinated motion with respect to the first object additionally based on the fifth multidimensional index and the sixth multidimensional index.

19. The system of claim 15, said processor is further for:
establishing, via the determining component, a predetermined threshold; and generating, via the determining component, a multidimensional index comparison based on a difference between the first multidimensional index and the second multidimensional index, and wherein the determining, via a determining component, whether the second object has coordinated motion with respect to the first object based on the first multidimensional index and the second multidimensional index comprises determining whether the second object has coordinated motion with respect to the first object based on a threshold comparison of the predetermined threshold and the multidimensional index comparison.

20. The system of claim 15, wherein said processor is further for:

receiving, via the velocity data receiving component, fifth velocity data associated with the first object at a third time;

receiving, via the velocity data receiving component, sixth velocity data associated with the second object at the third time;

receiving, via the position data receiving component, fifth position data associated with the first object at the third time;

receiving, via the position data receiving component, sixth position data associated with the second object at the third time; and generating, via the multidimensional indexing component, a fifth multidimensional index related to the first object at the third time; and generating, via the multidimensional indexing component, a sixth multidimensional index related to the second object at the third time, wherein the determining, via a determining component, whether the second object has coordinated motion with respect to the first object based on the first multidimensional index and the second multidimensional index comprises determining whether the second object has coordinated motion with respect to the first object additionally based on the fifth multidimensional index and the sixth multidimensional index.

\* \* \* \* \*